United States Patent Office 3,107,893
Patented Oct. 22, 1963

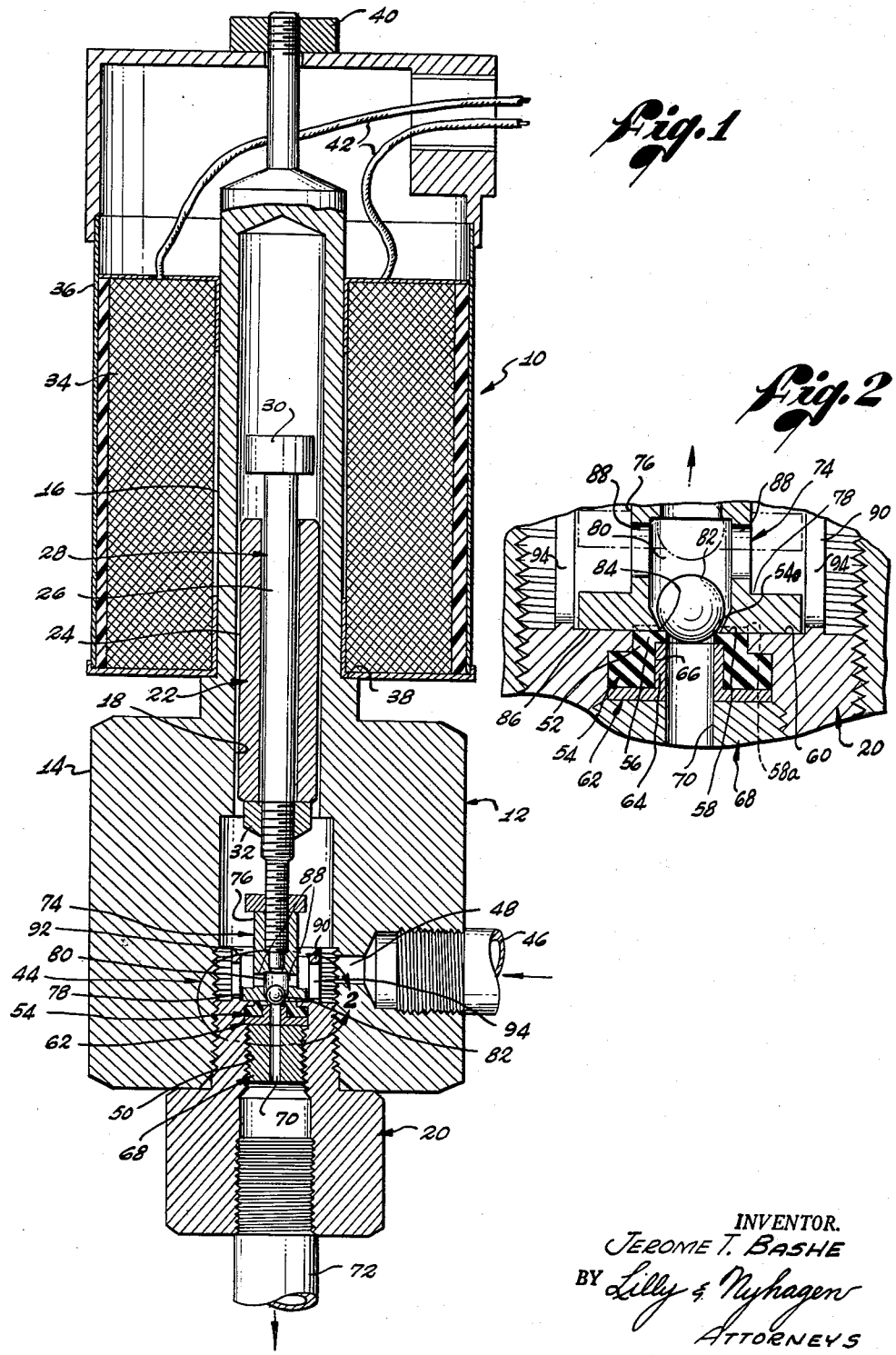

3,107,893
SOLENOID ACTUATED FLUID VALVE
Jerome T. Bashe, Torrance, Calif., assignor to Robbins Aviation, Inc., Los Angeles, Calif., a corporation of California
Filed Aug. 31, 1961, Ser. No. 135,174
6 Claims. (Cl. 251—86)

This invention relates generally to fluid valves and, particularly, to improvements in fluid valves intended primarily for use in high pressure fluid systems.

The important features of this invention have primary utility in one particular type of valve, namely, a solenoid valve. For this reason, the invention will be described chiefly in connection with a solenoid valve. It will become evident as the description proceeds, however, that many, if not all, of the improvement features of the invention are capable of useful application in other types of valves. Accordingly, the invention should not be regarded as limited to solenoid valves except as specifically required by the appended claims.

One of the major problems in the design of a high pressure solenoid valve is avoiding leakage of the high pressure fluid between the movable valve member and its valve seat. This, in turn, requires extremely accurate contact of the valve member with the valve seat. The problem is complicated by the fact that the armature of the valve must possess a certain freedom of movement in the valve body to assure return of the valve member carried by the armature to its closed position when the solenoid winding is deenergized. This freedom of movement is attained by providing suitable clearances between the armature and valve body which prevent accurate guidance of the valve member into precise engagement with its valve seat.

In the present valve, the valve seating difficulties presented by the loose fit of the armature in the valve body are overcome by utilizing a valve seat made of a yieldable material which undergoes cold flow to effect a perfect seal with the valve member as the latter is urged against the seat by the high system pressure. One problem attendant to the use of such a yieldable valve seat is that the forces which act on the armature during return of the valve member to its closed position, namely, the gravitational force, the force resulting from the static pressure of the fluid against the valve which rapidly increases as the valve closes, and the force resulting from the high velocity fluid flow between the valve member and valve seat which also increases rapidly as the valve closes, produce rapid acceleration of the armature toward the valve seat. The impact force generated by this rapid acceleration of the relatively large mass of the armature would exceed the elastic limit of available valve seat materials if the valve member were firmly attached to the armature. This difficulty is avoided in the present valve by allowing the valve member to "float" on the armature so that the member is driven against the seat only by the forces acting on the member itself and not the entire force on the armature. The float of the valve member also permits it to center itself on the valve seat.

A second problem attendant to the use of a yieldable valve seat is that the latter is prone to damage during each valve closure by erosion, foreign matter on the seat, and/or excessive penetration and deformation of the seat by the valve member in spite of its floating connection to the armature. A unique feature of the present valve resides in the fact that the end of the cage on the armature in which the floating valve member is confined is allowed to impact the valve seat about its seating edge proper on each closure of the valve. Each such impact effectively reshapes the seat to its original configuration and thereby repairs any damage which the seat may have incurred on the previous closure.

It is evident that if the valve cage were allowed unrestrained impact against the body of the valve seat, the latter would be damaged by the impacts themselves. Accordingly, another important feature of the invention resides in the provision of a noncritical impact face on the valve body about the valve seat against which the valve cage strikes after it impacts the valve seat. In this way, the deformation of the valve seat by the armature is accurately controlled to produce effective reshaping of but avoid damage to the valve seat.

The present valve has other unique features of construction which contribute to the efficiency of the valve. For example, the valve incorporates a guide which becomes effective to approximately center the valve cage with the valve seat as the cage approaches the seat so that proper self-centering of the valve member on the valve seat can occur. Another feature resides in the way the valve seat is held in the body, offering substantially complete envelopment of the seat. This envelopment makes possible the use of seat materials with cold flow characteristics not before practical in valves of this type.

As noted earlier, these features of the invention are not limited in their useful application exclusively to solenoid valves, but, rather, they can be utilized to good advantage in other types of valves.

With this preliminary discussion in mind, it is a general object of this invention to provide an improved high pressure valve utilizing a yieldable valve seat which undergoes cold flow to effect a perfect seal with the movable valve member upon each closure of the valve.

Another object of the invention is to provide a valve of the character described in which the valve seat is accurately reshaped to its original configuration on each valve closure so that damage incurred by the seat during closure by erosion, foreign matter on the seat, or excessive penetration of the seat by the valve member is repaired during each valve closure.

Yet another object of the invention is to provide a valve of the character described which utilizes a caged, floating, self-centering valve member and a guide for approximately centering the valve cage with the valve seat during each valve closure.

A further object of the invention is to provide a valve of the character described in which the valve seat is confined in a unique way which permits the use of seat materials having cold flow characteristics never before possible in valves of this type.

Yet a further object of the invention is to provide an improved solenoid valve having the features specified in the foregoing objects and wherein, further, the valve seat is reshaped by a controlled impact of the returning valve armature against the valve seat during each valve closure.

Other objects of the invention are concerned with providing a high pressure valve, especially a solenoid valve, which is completely leakproof, has a long operating life, effects a self-cleaning action of the valve seat, requires minimum precision of manufacture, possesses maximum reliability, and is otherwise ideally suited to its intended purposes.

A presently preferred embodiment of a solenoid valve incorporating the features of this invention will now be described by reference to the attached drawing, wherein:

FIG. 1 is a longitudinal sectional view taken through the solenoid valve; and

FIG. 2 is an enlargement of the area enclosed by the circular arrow 2 in FIGURE 1.

The solenoid valve illustrated in this drawing is denoted in its entirety by the numeral 10 and comprises a body 12 having an enlarged, lower cylindrical end 14 and a smaller diameter upper end 16. Extending axially through the body 12 and opening through the lower end of the body is a chamber or bore 18 which is counterbored and threaded at its lower end, as shown. Threaded in and closing the lower end of the bore 18 is a nut 20.

An armature 22 is loosely received within the bore 18 for relatively free movement therealong. This armature comprises a cylindrical, magnetically permeable hammer 24 which is slidably mounted on the stem 26 of a valve carrier 28. Hammer 24 is located between two shoulders 30 and 32 on the stem 26. The distance between these shoulders is somewhat greater than the length of the hammer 24 so that the latter is permitted limited movement on the stem 26. Valve carrier 28 is made of a nonmagnetically permeable metal.

Mounted on and encircling the upper end 16 of the valve body 12 is a solenoid winding or coil 34. This winding is contained within a housing 36 which is confined between an upwardly facing shoulder 38 on the valve body and a nut 40 threaded on the upper end of the valve body. Leads 42 of the winding 34 extend to the outside of the housing 36 for connection to an external voltage source through a suitable electrical switch (not shown). Normally, the armature 22 occupies the position shown in the bore 18. When the winding 34 is energized, an electromagnetic field is produced which moves the hammer 24 upwardly on the valve carrier stem 26 and into impact with the upper shoulder 30 on the stem. Continued upward movement of the hammer 24 then causes upward movement of the valve carrier 28. This upward movement of the valve carrier results in opening of valve means denoted generally by the numeral 44 and now to be described.

High pressure fluid is conveyed to the valve through an inlet conduit 46 and an inlet fluid passage 48 opening through a side wall of the bore 18. Extending axially through the nut 20 is a threaded opening 50 which communicates with the lower end of the bore 18 through a reduced opening 52, as shown best in FIG. 2. Closely fitted within the inner end of the threaded opening 50 is a yieldable valve seat 54 made of nylon or other suitable material having the cold flow characteristics hereinafter described. Valve seat 54 has a coaxial, cylindrical extension 56 which extends through and is closely fitted in the reduced opening 52. The normal axial extent of the extension 56 is somewhat greater than the axial length of the reduced opening 52 so that the end face 58 of the extension is normally disposed slightly beyond the end face 60 of the nut 20, as indicated at 58a. Fitted in the threaded opening 50, behind the valve seat 54, is a washer 62. This washer has a cylindrical, coaxial extension 64 which fits closely in a hole 66 in the adjacent side of the valve seat 54. Threaded in the opening 50, behind the washer 62, is an insert 68 which urges the washer 62 tightly against the valve seat 54. The valve seat is thereby tightly clamped between the nut 20 and the washer 62 to effect a static seal between the valve seat and the nut.

Extending coaxially through the valve seat 54, the washer 62, and the insert 68 is a fluid outlet passage 70. An outlet conduit 72 is threaded in the lower, slightly enlarged end of the nut opening 50 for conveying fluid away from the valve when the valve means 44 are open.

Threaded on the lower end of the valve carrier stem 26 is a valve cage 74. This valve cage includes an upper cylindrical body 76, on the lower end of which is a radial flange 78. Confined within the interior space 80 of the valve cage 74 is a valve member 82 in the form of a ball. Cage 74 has a reduced opening 84 through its lower end through which the ball 82 can protrude, as shown best in FIG. 2, for contact with the valve seat 54 when the cage occupies its position of FIG. 2. In this position, the forward face 86 of the cage 74 about the cage opening 84 contacts the face 60 of nut 20. Extending through the body 76 of the cage 74 and opening into the interior space 80 of the cage behind the ball 82 are ports 88.

A circular guide rim 90 is upstanding from the end face 60 of the nut 20. This guide rim is coaxial with the outlet passage 70 and is internally beveled at its end, as indicated at 92. The flange 78 on the valve cage 74 is proportioned to have a relatively close fit in the guide rim 90. This guide rim has ports 94.

When the winding 30 of the valve is deenergized, the valve carrier 28 occupies the position shown in FIG. 1 and in solid lines in FIG. 2 wherein, as already noted, the forward face 86 of the valve cage 74 rests on the end face 60 of the nut 20. In this position, the ball 82 engages the circular seating edge 54a of the valve seat 54 to close the outlet passage 70. In actual practice, the high pressure fluid acting on the upper side of the valve ball 82 urges the latter against the valve seat with appreciable force. As noted earlier, the valve seat is made of nylon or other suitable material having cold flow characteristics so that when the valve ball 82 is urged against the seat, the latter undergoes cold flow into exact conformance with and thereby forms a perfect seal with the ball. Under these conditions, no leakage whatsoever occurs between the ball and its seat even when the fluid in the system is a light gas, such as helium or hydrogen. The cage opening 84 through which the ball 82 protrudes into contact with the valve seat is of such diameter that the ball has limited freedom of lateral movement in the cage so as to achieve a self-centering action of the ball on the valve seat.

When the winding 34 is energized, the armature hammer 24 is attracted upwardly into impact with the shoulder 30 on the valve carrier 28. This impact develops the large force necessary to lift the ball 82 off of the valve seat 54 under the high system pressures contemplated for the valve. Continued upward movement of the hammer 24 under the action of the electromagnetic field draws the valve carrier 28 upwardly to the upper limit of travel of these parts. In this position, the valve cage 74 is withdrawn from the guide rim 90 so that ball 82 clears the valve seat 54 whereby unrestricted flow of fluid can occur from the inlet passage 48 to the outlet passage 70 of the valve. When the valve winding 34 is again de-energized, the armature 22 drops under the action of gravity. Eventually, the armature reaches a position in which the lower flange 78 on the valve cage 74 enters the beveled or flared end of the guide rim 90. This guide rim serves to guide the valve cage to an approximate centered position with respect to the outlet passage 70 during the final return travel of the armature to its position of FIG. 1. As preliminarily noted, this guidance of the valve cage is required because of the clearance between the armature 22 and the valve body 12 which is necessary to assure freedom of movement of the armature in the body.

As the ball 82 nears the valve seat 54, the flow of fluid through the ports 94 in the guide rim 90 to the outlet passage 70 becomes increasingly restricted, causing an increase in the velocity of the outgoing fluid. This effectively sweeps the valve seat clean as the valve closes. The increase in the velocity of the outgoing fluid causes a decrease in pressure in the high velocity fluid stream which results in a downward acceleration on the armature additional to that produced by the force of gravity. Also, of course, as the ball 82 nears its valve seat, the static pressure above the ball increases, producing yet an additional downward acceleration on the armature. The downward force on the armature, resulting from these accelerations, rapidly increases as the valve closes and finally results in initial high velocity impact of the forward face 86 of the valve cage with the currently, slightly protruding end face 58 of the valve seat 54 and, thereafter, final high velocity impact of the forward cage face 86 with the end face 60 of the nut 20. During the interval of travel of the valve cage from the position of initial contact of its forward face 86 with the end face 58 of the valve seat and the final position of contact of its forward face 86 with the end face 60 of the nut 20, the valve seat 54 is forcefully reshaped to its original configuration so that any damage to the seat that may have occurred as a result of foreign matter on the seat, seat erosion, or deformation of the seat due to excessive penetration of the ball 82 into the seat on the previous closure will be repaired. Thus, if for some reason the ball should penetrate the seat enough to cause cold flow of the seat material radially outward, the next seating of the cage against the protruding end face 58 of the valve seat will re-form the seat to its previous configuration. This reshaping of the valve seat by the valve cage, of course, is controlled or limited by contact of the forward cage face 86 with the end face 60 of the nut 20 so that effective reshaping of the valve seat, without damage to the latter, will result. The forward cage face 86 and end face 60 of the nut, therefore, function as cooperating, positive stop means on the armature and valve body for limiting movement of the valve cage toward the valve seat.

If the valve ball 82 were firmly attached to the armature, it would be driven into the valve seat with a force exceeding the elastic limits of available plastic materials suitable for this seat. This problem is overcome by affording the ball 82 with the ability to move or float in the cage 74 in the longitudinal direction of the armature and by providing the cooperating impact faces 86 and 60 on the valve cage and valve body whereby as the valve cage strikes the valve seat, the force of the blow is absorbed on the comparatively large, nonsealing, noncritical surfaces 86 and 58 and only the force due to the small mass of the ball is absorbed on the critical seat edge 54a. These forces are controlled by design to produce the correct amount of plastic deformation to insure shaping of the seat to provide long life with zero leakage.

The roundness of the valve ball 82 is, of course, not critical inasmuch as the seat 54 will deform to form a perfect seal with a ball manufactured to noncritical spherical tolerances and surface finish. While a valve ball 82 has been illustrated and described in connection with the present valve, it is obvious that a floating spherically rounded pin confined in the cage 74 may replace the ball 82 as the floating valve member.

The illustrated method of holding or confining the plastic valve seat 54 offers substantially complete envelopment of the seat and makes possible the use of seat materials with cold flow characteristics not before practical in this type of valve. This method of envelopment prevents the seat orifice 54a from being distorted by the use of the metal washer 62, the cylindrical extension or flange 64 of which fits into and supports the valve seat edge 54a proper.

Because of the self-cleaning action on the valve seat discussed earlier, the present valve is suited for service with contaminated media. Moreover, the valve is obviously suitable for use with hazardous gases and liquids because the electrical portion of the valve is not in contact with the fluid stream and the one static seal between the valve seat 54 and the nut 20 is the only possible source of external fluid leakage. Because of the above-described unique features of construction of the present valve, the latter may be used to control fluids at high pressures up to 12,000 or more p.s.i. Because of the noncritical tolerances of the valve, the latter may be economically produced by commercial manufacturing practices and the parts of one valve may be interchanged with the parts of another valve.

Clearly, therefore, the invention herein described and illustrated is fully capable of attaining the several objects and advantages preliminarily set forth.

What is claimed is:
1. A solenoid valve comprising:
a nonmagnetically permeable body having a bore, a fluid inlet to said bore, a fluid outlet extending axially from said bore to the outside of said body, and a valve seat about said outlet facing into said bore;
a valve carrier loosely fitted in said bore for movement toward and away from said valve seat;
valve means on the end of the carrier adjacent the valve seat for engaging the latter to close said outlet upon movement of the carrier toward the valve seat;
electromagnetic means including a coil on said body and magnetically permeable means on said carrier for moving the latter away from said valve seat against the action of an opposing force when said coil is energized, whereby said carrier is returned toward said valve seat by said opposing force when said coil is de-energized;
movement of said carrier toward said seat by opposing force being facilitated by the loose fit of the carrier in said bore; and
means defining an axially extending carrier guide about and accurately concentric with said valve seat for receiving said adjacent end of said carrier with a close sliding fit and accurately centering said valve means with respect to said valve seat as said carrier approaches said valve seat, the axial extent of said guide being appreciably less than the travel of said carrier under the action of said electromagnetic means, whereby said carrier disengages said guide during said travel and acquires substantial momentum under the action of said opposing force before re-engaging the guide.
2. The subject matter of claim 1 wherein:
the open end of said guide is beveled to facilitate entrance of said carrier thereinto.
3. A valve comprising:
a body having an internal chamber and a fluid inlet to said chamber;
a yieldable annular element mounted in and sealed to the wall of said chamber and having an annular face presented toward the interior of said chamber;
there being a fluid outlet from said chamber extending axially through said element and said element forming a deformable valve seat about said outlet;
a carrier mounted on said body for axial movement toward and away from said valve seat including a hollow cage on the end thereof adjacent to said valve seat, said cage having an end face presented toward said valve seat;
a ball confined in said cage and protrudable through a reduced axial opening in said cage end face to engage said valve seat upon movement of the carrier toward said seat;
said body having a rigid face about said valve seat presented toward said cage;
said annular element face normally projecting slightly beyond said body face, and said cage face being proportioned for engagement with both said body face and said annular element face to cause controlled compression of said element and thereby reshape said seat upon movement of said carrier toward said seat; and
means for selectively effecting axial movement of said carrier away from said valve seat to open said outlet and toward said valve seat into forced contact with the latter to simultaneously reshape said seat and close said outlet.
4. The subject matter of claim 3 wherein:
said valve is a solenoid valve and said means for effecting axial movement of said carrier includes magnetically permeable means on said carrier and electromagnetic means on said body for retracting said carrier away from said valve seat against the action of an opposing force, whereby when said electromag- netic means are de-energized, said carrier is returned toward said valve seat by said opposing force and said cage end face strikes said annular element face with an impact.

5. A valve comprising:

a body having an internal chamber and a fluid inlet to said chamber;

a yieldable annular element mounted in and sealed to the wall of said chamber and having an annular face presented toward the interior of said chamber;

there being a fluid outlet from said chamber extending axially through said element and said element forming a deformable valve seat about said outlet;

a carrier mounted on said body for axial movement toward and away from said valve seat including a hollow cage on the end thereof adjacent to said valve seat, said cage having an end face presented toward said valve seat;

a ball confined in said cage and protrudable through a reduced axial opening in said cage end face to engage said valve seat upon movement of the carrier toward said seat;

said body having a rigid face about said valve seat presented toward said cage;

selectively operable means for retracting said carrier away from said valve seat to open said outlet against the action of an opposing force and fluid pressure and for releasing said carrier for movement toward said valve seat to close said outlet under the action of said opposing force and fluid pressure; and said cage end face being proportioned to engage said body face when said ball engages said valve seat to close said outlet, whereby said carrier is prevented from creating a harmful impact on said yieldable element during movement of the carrier to close said outlet.

6. The subject matter of claim 5 wherein:

said valve is a solenoid valve and said means for retracting said carrier away from said valve seat comprises magnetically permeable means on said carrier and electromagnetic means on said body, said body comprising a nonmagnetically permeable material.

References Cited in the file of this patent

UNITED STATES PATENTS

| | | |
|---|---|---|
| 2,157,480 | Cole | May 9, 1939 |
| 2,310,745 | Parks | Feb. 9, 1943 |
| 2,629,766 | Vargo | Feb. 24, 1953 |
| 2,828,936 | Hales | Apr. 1, 1958 |
| 2,875,978 | Kmiecik | Mar. 3, 1959 |